United States Patent

Geoffroy

[19]

[11] Patent Number: 5,770,075
[45] Date of Patent: Jun. 23, 1998

[54] BEVERAGE FILTER

[76] Inventor: David P. Geoffroy, 1412 Serenade Ter., Corona del Mar, Calif. 92625

[21] Appl. No.: 806,534

[22] Filed: Feb. 24, 1997

[51] Int. Cl.$^6$ ................................................. B01D 29/085
[52] U.S. Cl. .................... 210/474; 210/477; 210/497.01; 99/295; 426/77; 493/941; 493/961
[58] Field of Search .................................. 210/474, 477, 210/482, 497.01; 426/77, 82, 89; 428/542.8; 493/187, 243, 310, 961, 941; 99/295

[56] References Cited

U.S. PATENT DOCUMENTS

| | | |
|---|---|---|
| 676,763 | 6/1901 | Nelson . |
| 2,093,980 | 9/1937 | Linger ...................... 210/474 |
| 2,126,584 | 8/1938 | Small ....................... 210/477 |
| 2,365,269 | 12/1944 | Hill ......................... 210/474 |
| 2,377,118 | 5/1945 | Weisman ................... 426/77 |
| 2,513,593 | 7/1950 | Smith . |
| 3,186,850 | 6/1965 | Anthony ................... 426/87 |
| 3,930,086 | 12/1975 | Harmon .................. 428/131 |
| 4,078,356 | 3/1978 | Gallo et al. .............. 426/410 |
| 4,145,294 | 3/1979 | Wilbur ..................... 210/474 |
| 4,801,464 | 1/1989 | Hubbard, Jr. ............. 426/77 |
| 4,859,476 | 8/1989 | Hertig ....................... 426/87 |

FOREIGN PATENT DOCUMENTS

| | | | |
|---|---|---|---|
| 1947146 | 12/1971 | Germany ................. 426/77 |
| 2702358 | 7/1978 | Germany ................. 426/77 |
| 2738969 | 3/1979 | Germany ................. 426/77 |
| 2929251 | 12/1982 | Germany ................. 426/77 |

*Primary Examiner*—W. L. Walker
*Attorney, Agent, or Firm*—Edward E. Roberts

[57] ABSTRACT

A beverage filter formed of porous paper, or other paper-like filter material for placement in the ground beverage container of a beverage brewing apparatus, such as a percolating coffee pot, in which the filter is graduated by being provided with indicia in the form of one or more of lines, colored lines, numerals and words, such indicia being affixed on the interior of such filter for readily viewing by the user. In the preferred embodiment, such indicia are affixed in at least two arrangements, one for a mild brew and one for a strong brew. Each arrangement includes markings or indicia for ground beverage level according to the volume of brew desired, such as by cups of coffee, for example. A user, utilizing any dispensing means including the ground beverage container itself, need simply fill the filter to the line corresponding to the desired volume at the desired strength.

10 Claims, 4 Drawing Sheets

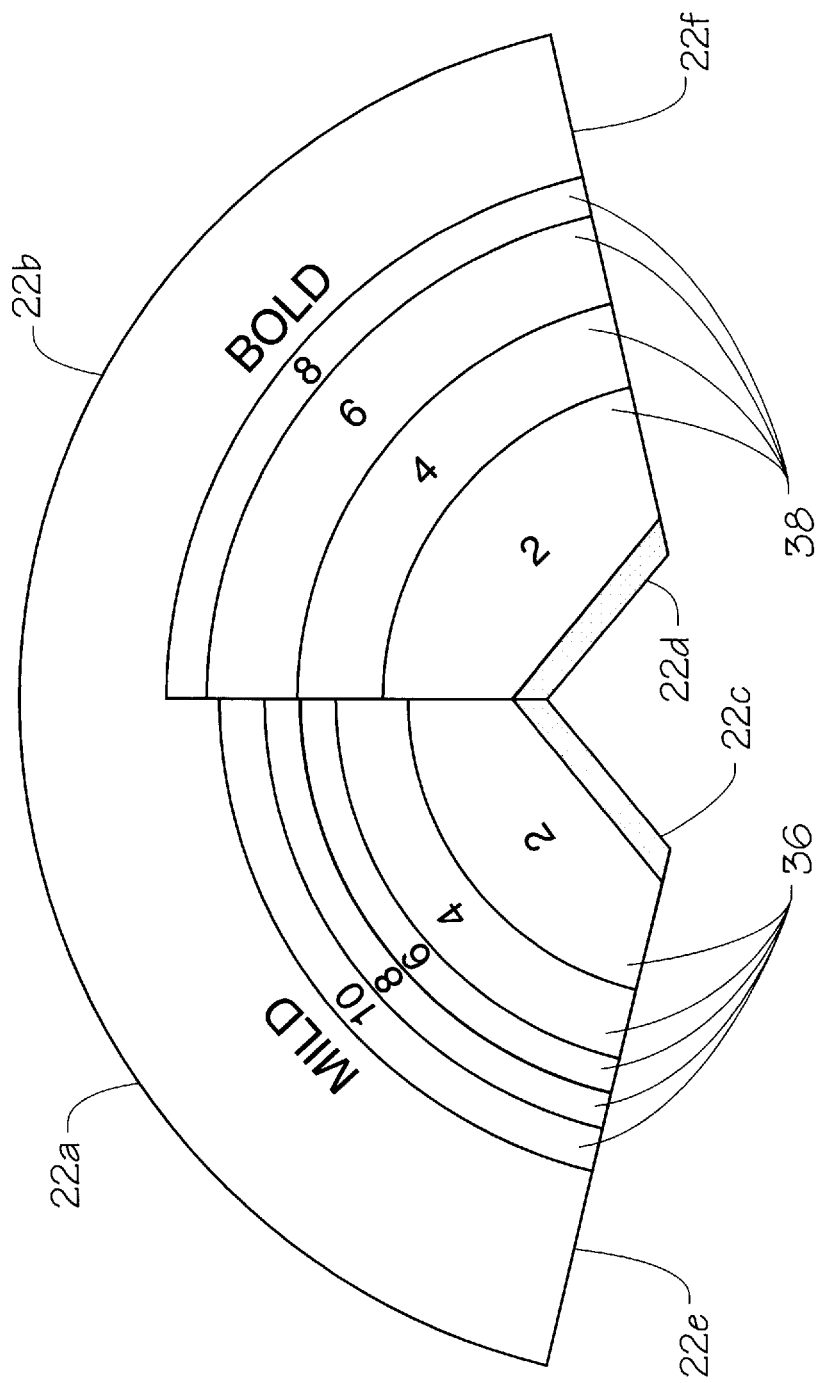

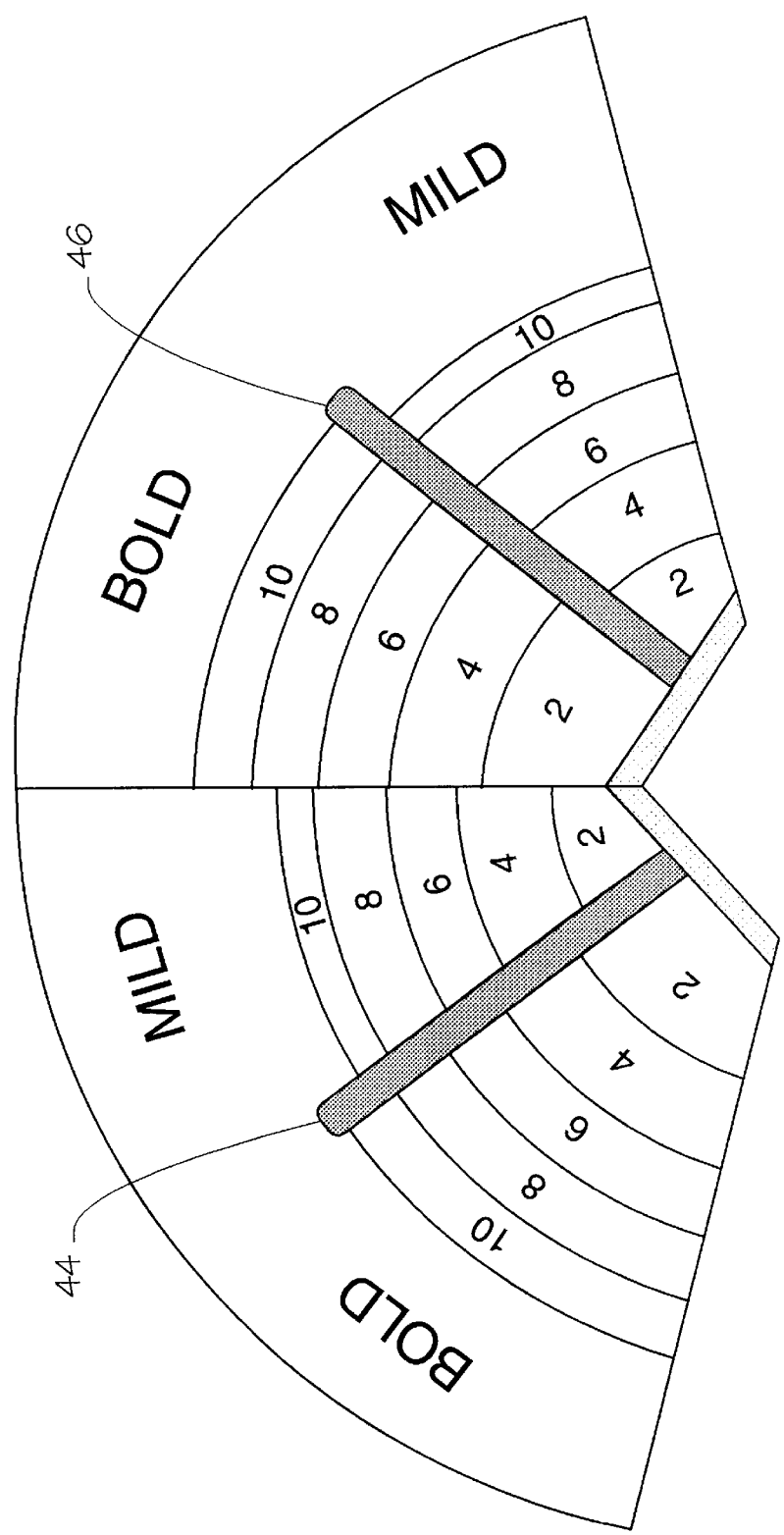

BEVERAGE FILTER

BACKGROUND OF THE INVENTION

1. Field of the Invention

This invention relates to filtration devices, and more particularly to a graduated flexible porous paper beverage filter for use with beverage pots, such as coffee pots capable of brewing a number of cups of coffee up to a preset maximum.

2. Description of the Prior Art

In recent times, automatic percolating coffee pots have become common. In such apparatus, there is provided a reservoir into which water is poured, a coffee pot and a generally cup-shaped container into which there is placed a filter of an appropriate size and configuration. In other percolating type apparatus, instead of a reservoir, hot water is poured from a pot through the container with filter into a coffee or beverage receptacle. The container may take any convenient shape such as bucket-shaped (or cylindrical), conical or frusto-conical, but in any event, it is provided with a centrally disposed aperture through which the brewed coffee passes into the coffee receptacle.

The filter is shaped to generally conform to the interior dimension of the container. The volume of the coffee receptacle may be any convenient number of cups such as six, eight, ten or twelve, and the receptacle is usually provided with graduated markings on the side thereof. While manufacturers of such automatic apparatus usually provide instructions concerning the volume of ground coffee (or other ground beverage) required for placement in the filter according to water volume, in practice, the strength of the brew of the beverage in the pot after brewing is normally provided by trial and error.

In addition, such measurements provided by the manufacturer are generally in tablespoons, which requires a measuring spoon, and many users do not distinguish between a level measure and a heaping measure, as a consequence of which results of the brew may vary. Accordingly, there is some degree of difficulty in obtaining the right beverage brew, be it weak, mild or strong, based on existing brewing apparatus and filters therefor.

In accordance with a feature of the present invention, there is provided a new and improved graduated filter for use with such coffee pot apparatus.

SUMMARY OF THE INVENTION

The foregoing and other objects of the invention are accomplished by providing a porous paper, or other paper-like filter for placement in the ground beverage container of a beverage brewing apparatus, such as a percolating coffee pot, in which the filter is graduated by being provided with indicia in the form of one or more of lines, colored lines, numerals and words, such indicia being affixed on the interior of such filter for readily viewing by the user. In the preferred embodiment, such indicia are affixed in at least two arrangements, one for a mild brew and one for a strong brew. Each arrangement includes markings or indicia for ground beverage level according to the volume of brew desired, such as by cups of coffee, for example. A user, utilizing any dispensing means including the ground beverage container itself, need simply to fill the filter to the line corresponding to the desired volume at the desired strength.

Other objects, features and advantages of the invention will become apparent on a reading of the specification when taken in conjunction with the drawings in which like reference numerals refer to like elements in the several views.

BRIEF DESCRIPTION OF THE DRAWINGS

FIG. 3 is a plan view of the blank for forming an alternate embodiment of the filter of FIG. 1; and FIG. 4 is a plan view of the blank for forming still another embodiment of the filter of FIG. 1.

DESCRIPTION OF THE PREFERRED EMBODIMENT

Figure 1:
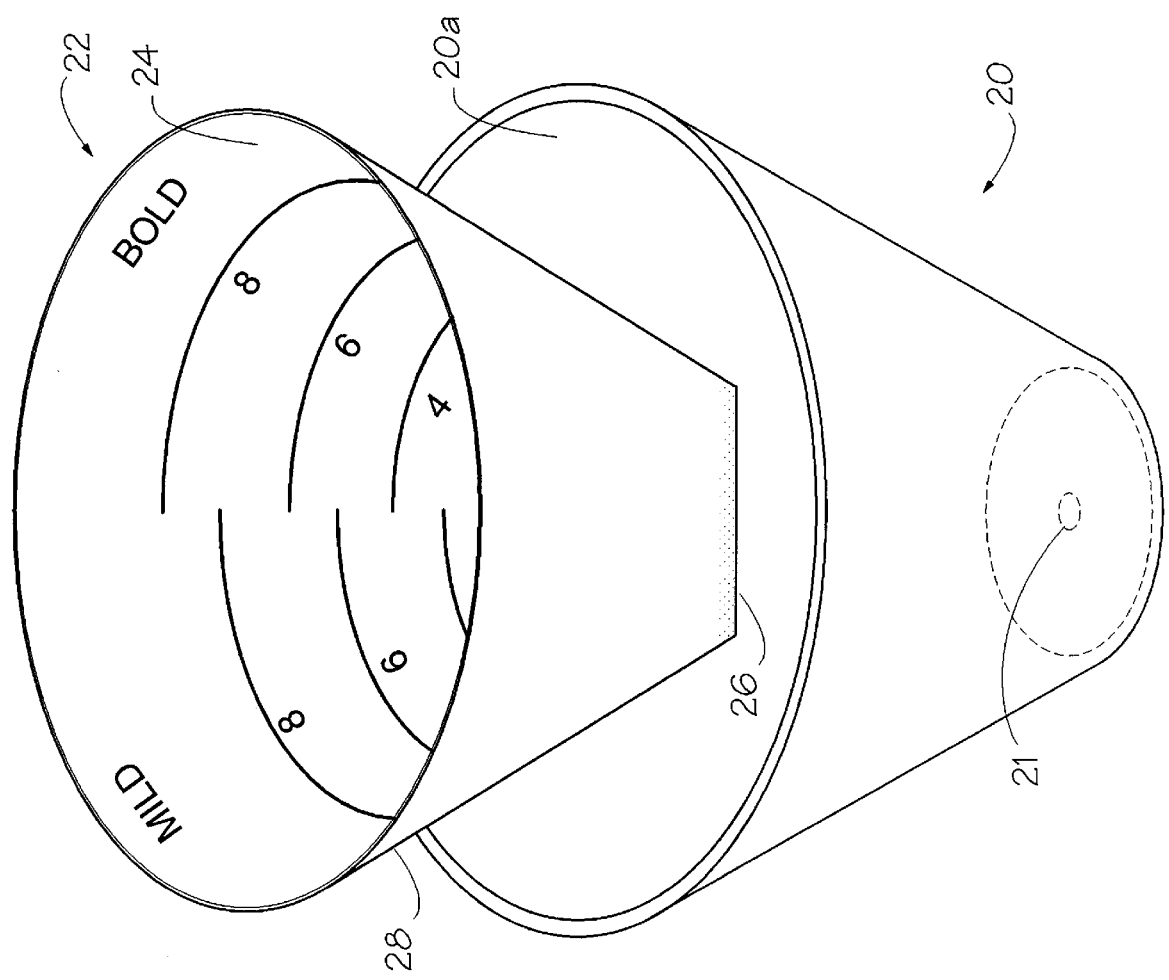
FIG. 1 is an exploded perspective view of a container receiving one embodiment of the beverage filter according to the invention.

Referring now to the drawings and particularly to FIG. 1, there is shown a perspective view of a container, generally designated 20, of a beverage brewing apparatus (not shown) for receiving a filter, generally designated 22, the filter 22 being of generally frusto-conical configuration and having a top opening 24, a bottom edge 26, and a continuously formed side 28. A bottom aperture 21 is formed in the bottom of the container 20 for release of beverage brewed therein as the hot water passes through ground beverage received within the filter 22. The filter 22 is geometrically configured, in size, dimension and configuration, to be received within the interior 20a of the container 20. The filter 22 is formed of generally flexible, generally porous filtration material, normally paper, although cloth or synthetic fabrics may be used. Such filters 22 are normally intended to be disposable and are made of biodegradable material.

Figure 2:
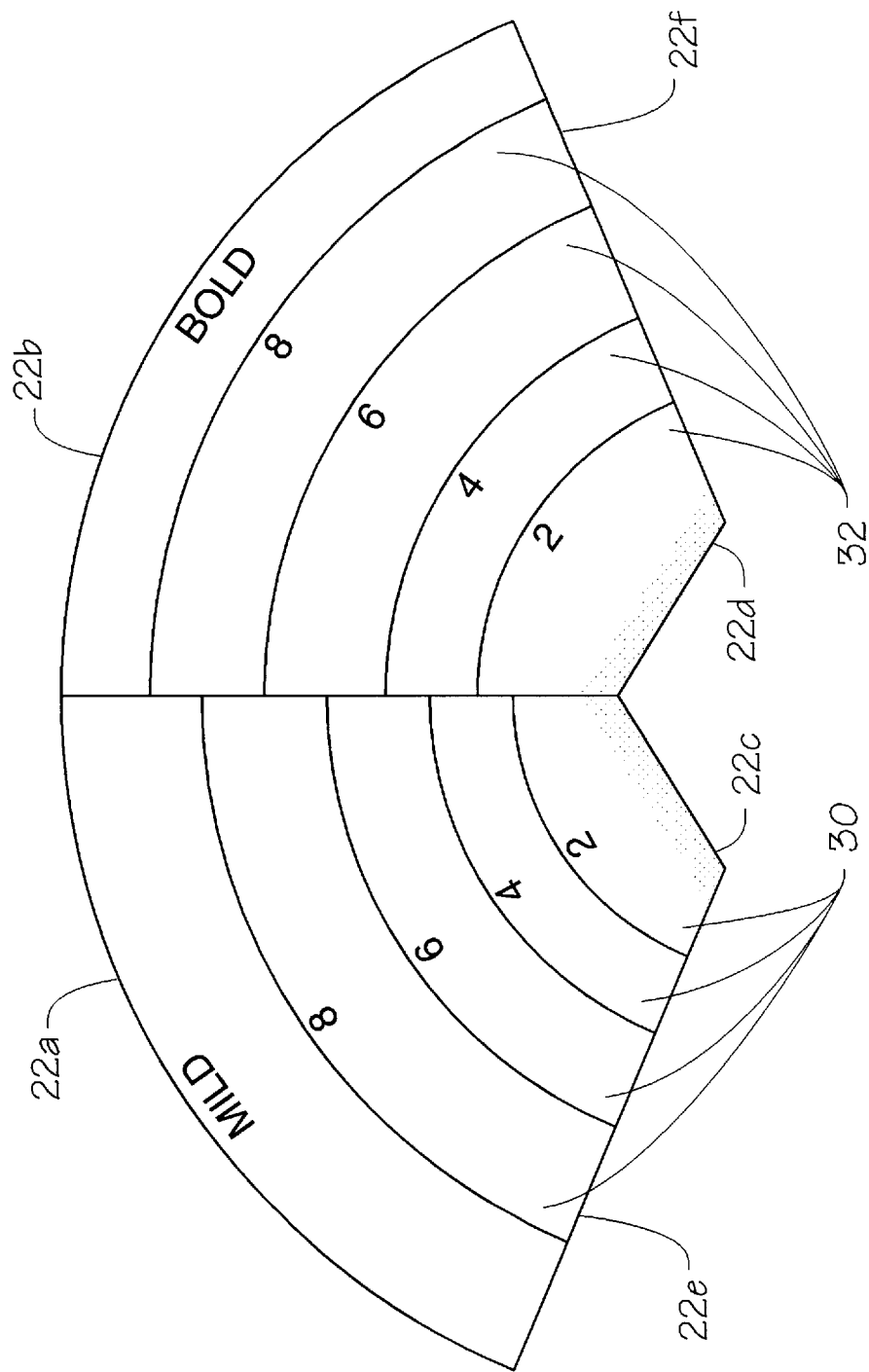
FIG. 2 is a plan view of the blank for forming the filter of the embodiment of FIG. 1.

By reference also to FIG. 2, the blank for filter 22 includes markings or indicia on the interior thereof, such indicia in the embodiment shown, being arranged in first and second sets. Primarily, as will become apparent, the indicia are arranged for simplifying the use of the brewing apparatus by enabling a user to simply pour the ground beverage into the filter 22 up to the desired height consistent with the desired strength of brews for a specified volume.

As shown in FIG. 2, the blank for the frusto-conical filter 22 is generally semicircular and formed of two generally identical sectors 22a and 22b with truncated bottoms 22c, 22d. The sides 22e and 22f of the blank are bonded together as are the two bottoms 22c, 22d with the top arcuate edges 22e, 22f forming the opening 24.

The first set of indicia on sector 22a include a plurality of lines 30 in generally parallel relation to the top edge which forms opening 24, with the spacing between lines 30 being predetermined for a given parameter of the brewed beverage, such as cups of brewed beverage. Adjacent each line is a numeric indicia (e.g., 2, 4, 6 and 8) representative of the number of cups of brewed beverage corresponding to the given line 30. The second set of indicia are correspondingly formed by imprinting on the filter fabric or material; however, it is to be noted that the indicia on sector 22b are positioned higher (with respect to the bottom edges 22c, 22d) on the material.

Furthermore, although the lines 32 thereon bear the same numeric indicia, the lines 32 are spaced slightly further apart. These two sets of lines form graduations within the interior of the filter 22, with the graduations being representative of a different given volumes of water to be used to prepare the brewed beverage, for example, cups of water. The indicia on sector 22a requires less ground beverage for a given number of cups that the indicia on sector 22b, as a consequence of which a user, utilizing the markings or indicia on sector 22b will brew a stronger beverage than if the markings on the sector 22a were used as a guide.

FIGS. 3 and 4 show alternate embodiments utilizing different sets of indicia. In FIG. 3, rather than lines, contiguous colored stripes 36 and 38 form the indicia with numeric indicia thereon. In addition, above the varicolored stripes there are imprinted the words "mild" on sector 22a and "bold" on sector 22b.

The embodiment of FIG. 4 utilizes lines as the lateral indicia; however, as shown there are two sets of identical indicia on each sector 22a and 22b, with the sets on each sector being divided by a vertical line 44, 46, respectively. This arrangement provides for ready visibility of both the "bold" and "mild" arrangements for brewing apparatus in which the spacing may not be sufficient for viewing or for any container in which the filter 22 is set at any angle.

In all of the above embodiments, the indicia, that is lines, stripes, or numerals are imprinted on the interior of filter 22 with edible, non-toxic material such as made with soy oil or the like. In the above description, it is to be understood that the usage of directional terms, such as top and bottom are with reference to the article as shown in the figures and as used, and is not intended to be limiting. In accordance with the present invention there has been shown and described a beverage filter device of economical construction, with visual markings or indicia to assist in its use.

Although there has been shown and described a preferred embodiment, it is to be understood that other modifications may be made within the spirit and scope of the invention.

What is claimed is:

1. A filter for use with a beverage brewing apparatus having a container for retaining the filter which receives the ground beverage through which hot water passes from a pot or reservoir through the filter and through aperture means in the container into a beverage receptacle, said filter comprising:
    a generally porous, generally flexible filtration material configured with an open top for being received within the container; and
    indicia on the interior sides of said material arranged in at least first and second sets, said first set including indicia of volume of ground beverage to be placed within the filter for brewing the beverage at a first strength for a given volume of brewed beverage, and said second set including indicia of volume of ground beverage to be placed within the filter for brewing the beverage at a second strength for the same given volume of brewed beverage.

2. The filter of claim 1 wherein the indicia of each set includes a plurality of generally parallel lines, at least some of said lines being marked with the number of cups applicable to each said line for the desired strength.

3. The filter of claim 1 wherein there are four sets of indicia arranged in equally spaced sectors of said material.

4. The filter of claim 1 wherein said indicia includes colored lines.

5. The filter of claim 1 wherein said indicia includes colored lines, with each of said lines having indicia in the form of numerals representative of the number of cups applicable to each said line for the desired strength.

6. A filter for use with a beverage brewing apparatus having a container for retaining the filter which receives the ground beverage through which hot water passes from a pot or reservoir through the filter and through aperture means in the container into a beverage receptacle, said filter being constructed of a generally porous, generally flexible filtration material configured for being received within the container and being configured, formed and dimensioned to the dimension of the interior of the container and having an open top; said filter further having indicia imprinted on the interior and arranged in at least first and second sets, said first set including indicia of volume of ground beverage to be placed within the filter for brewing the beverage of different given volumes at a first strength, and said second set including indicia of volume of ground beverage to be placed within the filter for brewing the beverage of the same given volumes at a second strength.

7. A blank for forming a beverage filter, said blank being formed in a generally semicircular configuration with at least two sets of indicia imprinted thereon, one set of indicia including indicia of volume of ground beverage to be placed within the filter for brewing the beverage of different given volumes at a first strength, and said second set including indicia of volume of ground beverage to be placed within the filter for brewing the beverage of the same given volumes at a second strength.

8. The blank of claim 7 wherein said blank includes a pair of two like sets of said indicia.

9. The blank of claim 7 wherein said indicia includes spaced lines and numeric indicia associated with each line representative of the volume associated with the distance of said line from the bottom of the blank.

10. The blank of claim 7 wherein said indicia includes colored stripes in contiguous relation and numeric indicia.

* * * * *